United States Patent
Lai et al.

(10) Patent No.: US 7,234,082 B2
(45) Date of Patent: Jun. 19, 2007

(54) APPARATUS OF REMOTE SERVER CONSOLE REDIRECTION

(75) Inventors: Te-Hsien Lai, Panchiao (TW); Kai-Feng Chiu, Taipei Hsien (TW); Tsai-Hung Huang, Taoyuan Hsien (TW); Chin-Fu Tsai, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 559 days.

(21) Appl. No.: 10/873,118

(22) Filed: Jun. 23, 2004

(65) Prior Publication Data

US 2005/0081084 A1 Apr. 14, 2005

(30) Foreign Application Priority Data

Oct. 9, 2003 (TW) ............................... 92128195 A

(51) Int. Cl.
*G06F 11/00* (2006.01)
(52) U.S. Cl. ............................... 714/42; 714/4; 714/43; 709/223; 709/224; 713/1; 713/2
(58) Field of Classification Search .................... 714/4, 714/43; 709/222, 224; 713/1, 2
See application file for complete search history.

(56) References Cited

U.S. PATENT DOCUMENTS

2005/0071461 A1* 3/2005 Mihm et al. ................. 709/224
2005/0091360 A1* 4/2005 Chen et al. .................. 709/223

* cited by examiner

*Primary Examiner*—Robert W. Beausoliel, Jr.
*Assistant Examiner*—Charles Ehne
(74) *Attorney, Agent, or Firm*—Rabin & Berdo, P.C.

(57) ABSTRACT

An apparatus of remote server console redirection is described. The apparatus provides multi-managers to control remote server computers simultaneously. The apparatus includes at least one monitoring computer and a console redirection proxy service server (CRPSS). The monitoring computer executes a browser program and assigns a remote server computer to be controlled. The CRPSS determines whether the assigned remote server computer is on monitoring. If the assigned remote server computer is on monitoring, the CRPSS directly sends display images of the assigned remote server computer to the monitoring computer. If the assigned remote server computer is not on monitoring, the CRPSS issues a console redirection command and a reboot command to the assigned remote server computer. Therefore, the display images of the assigned remote server computer are sent to the monitoring computer by way of the CRPSS.

20 Claims, 2 Drawing Sheets

APPARATUS OF REMOTE SERVER CONSOLE REDIRECTION

BACKGROUND OF THE INVENTION

1. Field of Invention

The invention relates to an apparatus of remote server console redirection and, in particular, to an apparatus of remote server console redirection for multiple users.

2. Related Art

As computers become popular and with the rapid development in network technology, people can quickly obtain desired information and various kinds of services through the Internet. The development of computer network indeed brings us convenient and comfortable life.

Transmission technology utilizing the network has a lot of progress in recent years. Therefore, computer systems comprised of few centralized computers or equipment are getting insufficient in practice. The computer system used in a normal company no longer contains only a few computers. Instead, they are often composed of computers and devices, such as the workstations, servers, databases, routers, and backup devices, distributed at different locations but connected by way of the network in order to provide various services.

In order to effectively manage computers at different locations, remote control becomes important. Remote server management generally has a two-tier structure and usually adopts the one-to-one management mode. However, as the software functions and hardware structure of servers become more complicated, it is often difficult for a single manager to fix problems or perform settings on the servers. In particular, the server problems may not be only on the software or hardware side. It is more likely that a problem is caused by software failure that also results in hardware breakdown.

Therefore, it would be a problem if the management, maintenance, and problem shooting of remote servers only rely on a few managers. It will be highly desirable that one can effectively combine the efforts of several software and hardware managers along with server users, salesmen, and manufacturers, and even the system designers and integrators to maintain the servers. This will make the server management and problem solving much easier and faster.

SUMMARY OF THE INVENTION

In view of the foregoing, we know that the conventional management of remote server computers is performed in the one-to-one mode. That cannot provide sufficient supports for network managers to solve problems when facing the increasingly complicated software and hardware on the servers. We are therefore eager to find an apparatus of remote server console redirection that provides multiple managers to control remote server computers simultaneously. It can effectively increase the problem solving ability and lower the costs required for remote management. It further renders the remote server management more popular and efficient.

An objective of the invention is to provide an apparatus of remote server console redirection that enables multiple managers to control remote server computers simultaneously. This makes the server problem shooting and solving more convenient and efficient.

Another objective of the invention is to provide an apparatus of remote server console redirection which uses a baseboard management controller (BMC) and a network interface controller (NIC) shared with the system to perform network packet transmissions. This can lower the cost of remote server management.

A further objective of the invention is to use a three-tier network management mode to enable multi-manager controls of remote servers. A web-based browser program independent of the platform is provided to allow a manager to control remote servers on various kinds of platforms.

In accord with the above-mentioned objective, the invention provides an apparatus of remote server console redirection to enable several monitoring computers to control several server computers. The apparatus of remote server console redirection contains at least one monitoring computer and a console redirection proxy service server (CRPSS). The monitoring computer executes a web-based browser program that is independent of the platform and assigns a remote server computer to be controlled.

After receiving the above-mentioned control command, the CRPSS determines whether the assigned remote server computer is on monitoring. If the assigned remote server computer is on monitoring, the CRPSS directly sends display images of the assigned remote server computer to the monitoring computer. The monitoring computer uses the above-mentioned browser program to monitor the display images of the server.

If the assigned remote server computer is not on monitoring, the CRPSS issues a console redirection command and a reboot command to the BMC of the assigned remote server computer. The console redirection command corrects the function of the console redirection in the basic input/output system (BIOS) memory of the assigned remote server to be ON. The reboot command makes the console redirection function of the assigned remote server start functioning. The display images of the assigned remote server are transmitted to the CRPSS, which further sends the images to the monitoring computer.

The console redirection command contains a network port number for data transmissions between the CRPSS and the BMC of the remote server. The reboot command uses power on self test (POST) to start the console redirection function of the remote server. The BMC of the remote server uses a user data gram protocol (UDP) 623 port of a NIC shared with the system to communicate with the network port set by the CRPSS.

The monitoring computer downloads a Java Applet from the CRPSS and executes it in order to establish the connection with the CRPSS for display image transmissions. The server computer further contains a baseboard management controller (BMC) to execute the command transmitted from the monitoring computer. These commands are the control commands written in the intelligent platform management interface (IPMI) standard format that satisfies the remote management control protocol (RMCP).

Another embodiment of the invention provides a method of remote server console redirection. The method includes the following steps. A monitoring computer sends out a server image monitoring command. A CRPSS determines whether the assigned remote server is on monitoring. If the assigned remote server is not on monitoring, a console redirection command and a reboot command are sent to the assigned remote server computer. At the same time, a network port is provided to a BMC of the server computer. The console redirection function of the BIOS memory in the server computer is modified to be ON. The server computer is rebooted. A POST is used to start the console redirection function. The UDP 623 port of the BMC of the server computer transmits the display images of the remote server computer to the above-mentioned network port. The display images are then transmitted to the monitoring computer.

If the remote server is already on monitoring, the display images are directly sent to the monitoring computer for direct control.

The disclosed apparatus and method of remote server console redirection simultaneously enables multiple server computers to be managed by several monitoring computers through a CRPSS. The BMC and the NIC shared with the system are further employed to lower the management cost of remote server computers. The efficiency of solving problems on the servers is raised because multiple server managers can access the servers at the same time. The invention makes use of the managing privilege of managers to avoid the remote server control from being chaotic. Consequently, the disclosed apparatus and method of remote server console redirection not only effectively reduce the hardware cost for remote server control, but also facilitate the server management.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The specification discloses an apparatus of remote server console redirection that not only effectively enables multiple managers to perform online control on remote servers, but also use a baseboard management controller (BMC) and a network interface controller (NIC) shared with the system to lower the monitoring costs for the remote servers. The present invention will be apparent from the following detailed description, which proceeds with reference to the accompanying drawings, wherein the same references relate to the same elements.

Figure 1:
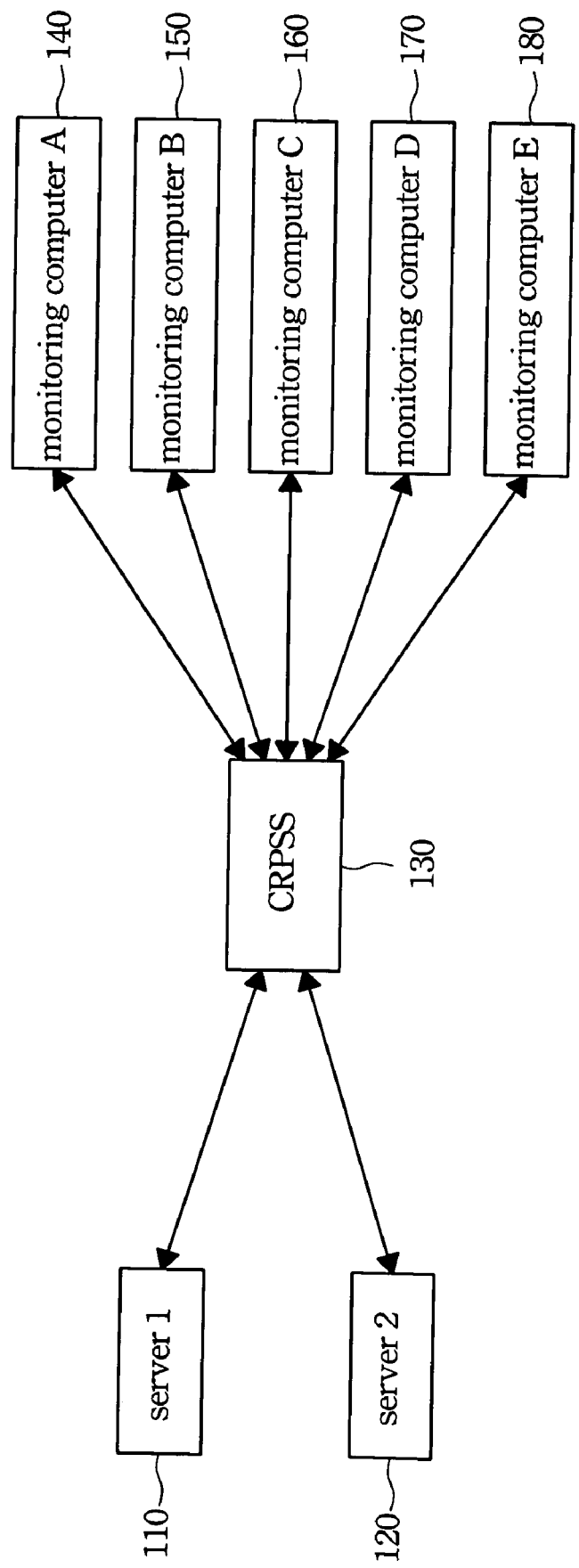
FIG. 1 is a schematic view of the disclosed apparatus of remote server console redirection.

As shown in FIG. 1, the disclosed apparatus of remote server console redirection can simultaneously monitor several server computers and enable management by multiple managers. The server 1 (110) and server 2 (120) represent two server computers being controlled. Through the redirection of the console redirection proxy service server (CRPSS) 130, the two servers are connected to a monitoring computer A (140), a monitoring computer B (150), a monitoring computer C (160), a monitoring computer D (170), and a monitoring computer E (180). That is, many monitoring computers manage the remote servers simultaneously by way of the CRPSS 130.

The monitoring computer A (140), the monitoring computer B (150), the monitoring computer C (160), the monitoring computer D (170), and the monitoring computer E (180) can represent either five different computers or five browser windows on the same computer. The CRPSS 130 can also be integrated inside any monitoring computer without departing from the spirit of the invention.

Figure 2:
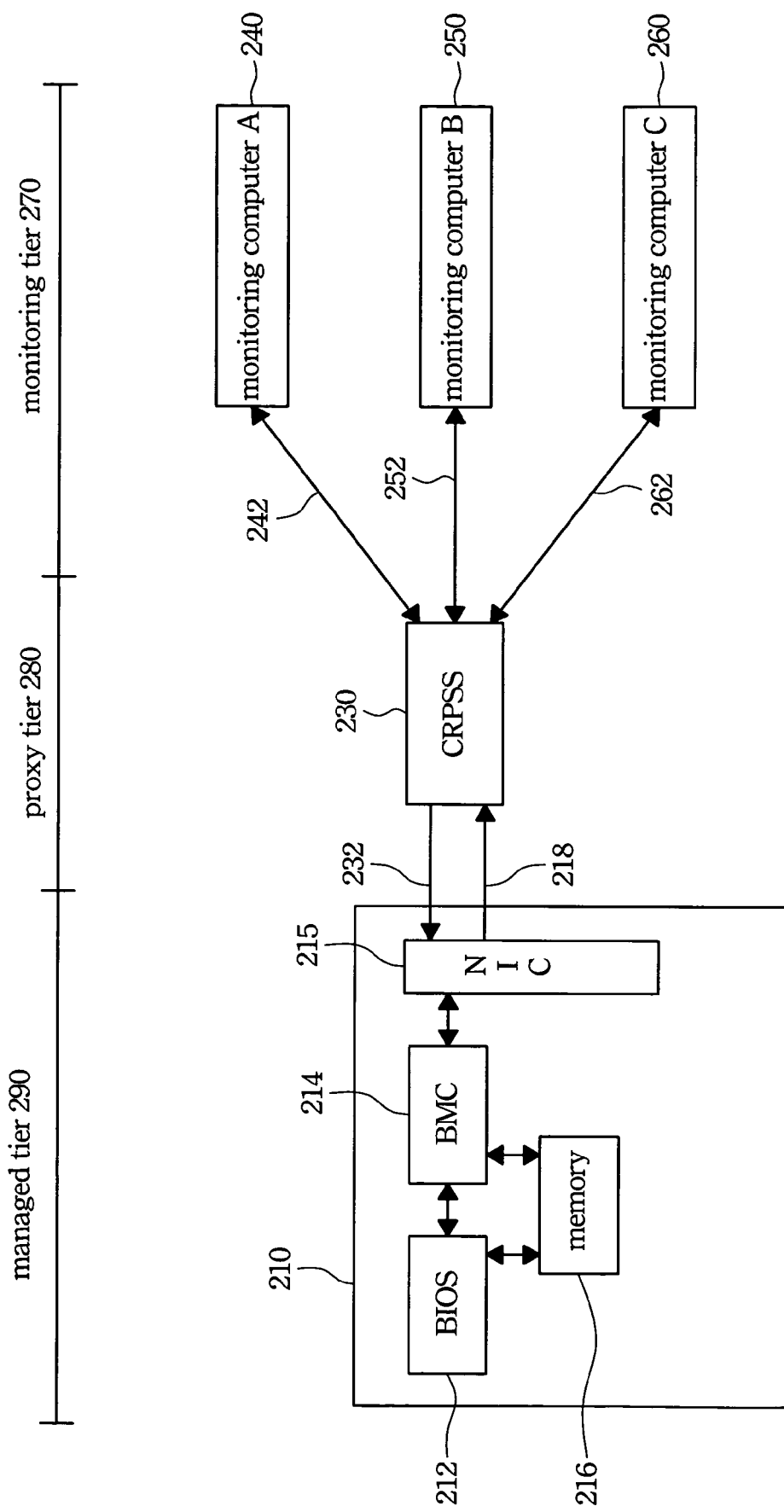
FIG. 2 is a schematic view of the three-tier management structure according to the invention.

With reference to FIG. 2, the present remote server console redirection apparatus is a three-tier management structure. The three-tier management structure of the invention has a monitoring tier 270, a proxy tier 280, and a managed tier 290. We use a single server 210 as an example to explain the functions of the managed tier 290. As described above, the disclosed apparatus of remote server console redirection can simultaneously control multiple remote servers. The monitoring tier 270 will be explained using the monitoring computer A (240), the monitoring computer B (250), and the monitoring computer C (260) as an example.

When we want to perform remote controls on the server 210, any of the monitoring computers A, B and C sends a command to the CRPSS 230. Suppose a server manager uses the monitoring computer A (240) to remotely control the server 210, he or she sends a command to the CRPSS 230. The monitoring computer A (240) uses a browser that provides the platform independent network monitoring function to monitor the server. After the CRPSS 230 receives the command from the monitoring computer A (240), it determines that the server 210 is not currently on monitoring. Through the connection 232, the CRPSS 230 issues a console redirection command and a reboot command to the BMC of the server 210 using the remote management control protocol (RMCP). These two commands are control commands written in the intelligent platform management interface (IPMI) standard format that satisfies the RMCP.

The BMC of the server 210 obtains the two control commands via the user datagram protocol (UDP) 623 port of the NIC 215 shared with the system. The console redirection command further contains a predetermine port for the BMC 214 of the server computer 210. For example, the UDP 623 port is an out of band data input/output (IO) port. That is, when a packet is received, it is transmitted to BMC if its destination port is UDP 623 and to the system 210 otherwise.

At the same time, the monitoring computer A (240) downloads a Java Applet from the CRPSS 230 in the proxy tier 280 and executes it. It also establishes the connection 242.

The server 210 executes the above-mentioned two control commands. First, the BMC 214 sets memory 216 in the basic input/output system (BIOS) 212. Such memory can be complementary metal oxide semiconductor (CMOS) random access memory (RAM). The console redirection function of the server set in the memory 216 is turned on. Afterwards, the server is rebooted in order to establish a monitoring connection 218 with the CRPSS 230 using the predetermine port sent from the CRPSS 230.

When the BIOS 212 performs the power on self test (POST), it detects that the console redirection function of the server as ON. The power on images are transmitted to the BMC 214 and to the CRPSS 230 via the monitoring connection 218. The CRPSS 230 further transmits the power on images to the monitoring computer A (240) via the connection 242. At the moment, the monitoring computer A (240) uses the same connection to send a control command to the server 210.

If another server manager wants to use the monitoring computer B (250) to control the server 210, it first notifies the CRPSS 230 about the image monitoring. It further downloads the Java Applet from the CRPSS 230 to establish a connection 252. After the CRPSS 230 determines that the server 210 is already on monitoring, it does not start the console redirection function on the server 210 again. The CRPSS 230 directly passes the images transmitted to the monitoring computer A (240) over to the monitoring computer B (250). In this case, both the server managers at the monitoring computer A (240) and the monitoring computer B (250) can obtain the power on images of the server 210 and perform problem solving or settings. Using the disclosed apparatus of remote server console redirection, two server managers at different locations can simultaneously obtain the required image data and monitor the server for solving possible problems. Therefore, the problem solving efficiency increases and lowers costs decrease during the breakdown of servers.

Simultaneously, the monitoring computer C (260) can monitor the server 210 using a connection 262 in the same way as the monitoring computer B (250). In other words, different experts can use the disclosed apparatus of remote server console redirection to obtain the required image data for monitoring and solving problems on the server 210.

When many managers are monitoring the server at the same time, it is crucial to avoid confusions at the server 210 as different people enter their own commands. The disclosed apparatus of remote server console redirection also provides the function of management according to manager's privileges. For example, it only allows a single main manager to send commands whereas other managers are only given the monitoring function. This is so until the main manager transfer or quit the privilege, and another auxiliary manager then obtains the command input privilege. This is the management mode with a single main manager. The auxiliary manager who obtains the command input privilege can be determined by the original main manager or randomly selected. It can also be determined according to the login order of the managers. In general, the invention also allows multiple main managers and multiple auxiliary managers to control the server. Again, the main managers are endowed with the command input privilege and the auxiliary managers with only the monitoring privilege. This is the management mode with multiple main managers. The commands are executed according to the first-in-first-execute management mode.

Using the IPMI standard, the system can rapidly perform remote maintenance. Using the disclosed three-tier apparatus of remote server console redirection, multiple-manager and multiple-server management and problem solving are enabled to increase the efficiency. The CRPSS of the invention can simultaneously provide the information of several servers being monitored for a monitoring computer to assign a server to be controlled.

The disclosed apparatus of remote server console redirection not only provides the multiple-manager server monitoring ability to effectively increase the problem solving efficiency, it can further use the BMC and the NIC shared with the system to reduce the cost of remote server controls. The management according to the manager's privilege makes the remote server control more conveniently.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An apparatus of remote server console redirection simultaneously controlling a plurality of server computers with a baseboard management controller (BMC), the apparatus comprising:
 a monitoring computer, which executes a browser program and assigns one of the server computers to be controlled; and
 a console remote proxy service server (CRPSS), which determines whether the assigned server computer is on monitoring when receiving an image monitoring command sent out by one of the monitoring computers;
 wherein when the assigned server computer is on monitoring, display images of the assigned server computer are transmitted to the monitoring computer that sends out the image monitoring command and are monitored using the browser program running thereon; and
 when the assigned server computer is not on monitoring, the CRPSS issues a console redirection command and a reboot command to the BMC of the assigned server computer, with the console redirection command modifying the console redirection function in the basic input/output system (BIOS) system of the assigned server computer as ON and the reboot command starting the console redirection function of the assigned server computer, the display images of the assigned server computer are transmitted to the CRPSS and, through the CRPSS, further to the monitoring computer that sends out the image monitoring command, and the display images of the assigned server computer are monitored using the browser program running on the monitoring computer that sends out the image monitoring command.

2. The apparatus of claim 1, wherein the browser program is a web-based browser program independent of the platform.

3. The apparatus of claim 1, wherein the console redirection command contains a network port of the CRPSS for the CRPSS and the BMC of the assigned server computer to transmit the display images.

4. The apparatus of claim 1, wherein the reboot command starts the console redirection function on the assigned server computer using the power on self test (POST) thereof.

5. The apparatus of claim 1, wherein the BMC of the server computer uses a user datagram protocol (UDP) 623 port of a network interface controller (NIC) shared with the system to transmit the display images to the CRPSS, the packets for the UDP 623 port being transmitted to the BMC whereas other packets to the system.

6. The apparatus of claim 1, wherein the monitoring computer that sends out the image monitoring command further downloads a Java Applet via the CRPSS from a network and executes it to establish a transmission connection for the display images with the CRPSS.

7. The apparatus of claim 1, wherein the memory is selected from the group comprising complementary metal oxide semiconductor (CMOS) random access memory (RAM) and CMOS NVRAM (non-versatile RAM).

8. The apparatus of claim 7 further comprising a computer management mode selected from the group comprising a single-main-manager mode and a multiple-main-manager mode.

9. The apparatus of claim 1 further comprising a baseboard management controller (BMC) which controls the server computer to execute the console redirection command and the reboot command and to transmit the display images.

10. The apparatus of claim 9, wherein the console redirection command and the reboot command are control command written in the intelligent platform management interface (IPMI) standard format that complies with the remote management control protocol (RMCP).

11. A system of remote control console redirection comprising:
 a plurality of server computers, each of which contains:
  a basic input/output system (BIOS);

a memory coupling to the BIOS for recording settings of the BIOS;

a baseboard management controller (BMC) coupling to the BIOS and the memory for controlling the server computer; and a system network interface controller (NIC) coupling to the BMC to use a plurality of user datagram protocol (UDP) ports to perform an out of band data transmission, wherein a packet of a specific UDP port is transmitted to the BMC and others to the system;

a monitoring computer, executing a browser program and assigning one of the server computers to be controlled; and a console remote proxy service server (CRPSS), which couples among the server computers and the monitoring computers to receive a server image monitoring command sent out from the monitoring computers and determines whether the assigned server computer is on monitoring;

wherein when the assigned server computer is on monitoring, display images of the assigned server computer are transmitted to the monitoring computer that sends out the image monitoring command and are monitored using the browser program running thereon; and when the assigned server computer is not on monitoring, the CRPSS issues a console redirection command and a reboot command to the BMC of the assigned server computer, with the console redirection command modifying the console redirection function in the basic input/output system (BIOS) system of the assigned server computer as ON and the reboot command starting the console redirection function of the assigned server computer, the display images of the assigned server computer are transmitted to the CRPSS and, through the CRPSS, further to the monitoring computer that sends out the image monitoring command, and the display images of the assigned server computer are monitored using the browser program running on the monitoring computer that sends out the image monitoring command.

12. The system of claim 11, wherein the browser program is a web-based browser program independent of the platform.

13. The system of claim 11, wherein the console redirection command contains a network port of the CRPSS for the CRPSS and the BMC of the assigned server computer to transmit the display images.

14. The system of claim 11, wherein the reboot command starts the console redirection function on the assigned server computer using the power on self test (POST) thereof.

15. The system of claim 11, wherein the monitoring computer that sends out the image monitoring command further downloads a Java Applet via the CRPSS from a network and executes it to establish a transmission connection for the display images with the CRPSS.

16. The system of claim 11, wherein the UDP port is the UDP 623 port.

17. The system of claim 11, wherein the console redirection command and the reboot command are control command written in the intelligent platform management interface (IPMI) standard format that complies with the remote management control protocol (RMCP).

18. A method of remote server console redirection comprising the steps of:

sending a server image monitoring command from a monitoring computer to a console remote proxy service server (CRPSS) and assigning a server computer;

determining whether the assigned server computer is on monitoring and when the assigned server computer is not on monitoring;

sending a console redirection command and a reboot command from the CRPSS to the baseboard management controller (BMC) of the server computer;

providing a network port to the BMC of the server computer;

modifying the console redirection function in the BIOS memory of the server computer as ON;

rebooting the server computer to start the console redirection function using power on self test (POST);

transmitting display images of the server computer from the user datagram protocol (UDP) port of the server computer to the network port of the CRPSS;

transmitting the display images to the monitoring computer; and using a browser program to monitor the display images.

19. The method of claim 18, wherein if the step of determining whether the assigned server computer is on monitoring finds that the server computer is on monitoring the display images of the server computer are directly transmitted to the monitoring computer, followed by the step of using a browser program to monitor the display images.

20. The method of claim 18, wherein the console redirection command and the reboot command are control command written in the intelligent platform management interface (IPMI) standard format that complies with the remote management control protocol (RMCP).

* * * * *